(12) United States Patent
Waters

(10) Patent No.: US 7,487,742 B2
(45) Date of Patent: Feb. 10, 2009

(54) APPARATUS AND METHOD TO REMOVE ANIMAL WASTE FROM LITTER

(76) Inventor: Michael Waters, 372 Bateman Cir. North, Barrington Hills, IL (US) 60010

( * ) Notice: Subject to any disclaimer, the term of this patent is extended or adjusted under 35 U.S.C. 154(b) by 273 days.

(21) Appl. No.: 11/278,650

(22) Filed: Apr. 4, 2006

(65) Prior Publication Data

US 2007/0227457 A1    Oct. 4, 2007

(51) Int. Cl.
*A01K 29/00* (2006.01)
(52) U.S. Cl. .................. 119/166; 119/165; 119/161
(58) Field of Classification Search .......... 119/161, 119/165, 166, 167, 168, 169, 170; 209/270, 209/288, 296, 350, 362
See application file for complete search history.

(56) References Cited

U.S. PATENT DOCUMENTS

| | | |
|---|---|---|
| 2,039,783 A | 5/1936 | Ebeling |
| 2,204,416 A | 6/1940 | Kramer |
| 3,071,110 A | 1/1963 | Fox |
| 3,227,138 A | 1/1966 | Campbell |
| 3,316,880 A | 5/1967 | Jungles et al. |
| 3,318,285 A | 5/1967 | Betham |
| 3,621,817 A | 11/1971 | Printz |
| 3,734,057 A | 5/1973 | Lee et al. |
| 3,747,563 A | 7/1973 | Brockhouse |
| 3,771,491 A | 11/1973 | Hunter |
| 3,793,988 A | 2/1974 | Traeger |
| 3,811,410 A | 5/1974 | Roberts |
| 3,835,812 A | 9/1974 | Edwards |
| 3,842,803 A | 10/1974 | Temel |
| 3,871,331 A | 3/1975 | Breau |
| 3,954,086 A | 5/1976 | Maness |
| 4,011,836 A | 3/1977 | Temel |
| 4,011,837 A | 3/1977 | Ksioszk |
| 4,050,414 A | 9/1977 | Knochel et al. |
| 4,098,229 A | 7/1978 | Haynes et al. |
| 4,117,555 A | 10/1978 | Dennis |
| 4,120,264 A | 10/1978 | Carter |
| 4,196,693 A | 4/1980 | Unversaw |
| 4,242,763 A | 1/1981 | Walker |
| 4,271,544 A | 6/1981 | Hammond |
| 4,465,018 A | 8/1984 | Mopper |
| 4,493,288 A | 1/1985 | van der Kolk |
| 4,502,413 A | 3/1985 | Ponce et al. |
| 4,574,735 A | 3/1986 | Hohenstein |
| 4,660,506 A | 4/1987 | Nalven |

(Continued)

FOREIGN PATENT DOCUMENTS

DE    3534522 A1    4/1986

(Continued)

*Primary Examiner*—T. Nguyen
(74) *Attorney, Agent, or Firm*—Fitch, Even, Tabin & Flannery

(57) ABSTRACT

An apparatus and method for separating animal waste from litter are provided. In one form, the apparatus includes a drum that contains litter and a helical rake that is rotatable in the drum. The rake can rotate relative to the drum to reduce power requirements for the rotary rake drive. Preferably, the drum is also rotatable by turning of the rake in the drum, but only for a limited, fixed angular distance which also reduces peak power requirements for the rotary drive motor for the rake.

12 Claims, 12 Drawing Sheets

U.S. PATENT DOCUMENTS

| | | |
|---|---|---|
| 4,716,853 A | 1/1988 | d'Aniello |
| 4,729,342 A | 3/1988 | Loctin |
| 4,787,334 A | 11/1988 | Bassine |
| 4,844,011 A | 7/1989 | Strickland |
| 4,846,104 A | 7/1989 | Pierson, Jr. |
| 5,003,920 A | 4/1991 | Miksitz |
| 5,048,463 A | 9/1991 | Wilson et al. |
| 5,048,464 A | 9/1991 | Shirley |
| 5,048,465 A | 9/1991 | Carlisi |
| 5,107,797 A | 4/1992 | LaRoche |
| 5,113,801 A | 5/1992 | Rotstein et al. |
| 5,184,575 A | 2/1993 | Reinartz |
| 5,188,062 A | 2/1993 | Joy et al. |
| 5,226,388 A | 7/1993 | McDaniel |
| 5,259,340 A | 11/1993 | Arbogast |
| 5,267,530 A | 12/1993 | Zamoyski |
| 5,279,258 A | 1/1994 | Kakuta |
| 5,289,799 A | 3/1994 | Wilson |
| 5,458,090 A | 10/1995 | Favreau |
| 5,460,122 A | 10/1995 | Reinartz |
| 5,477,812 A | 12/1995 | Waters |
| 5,494,001 A | 2/1996 | Leibowitz |
| 5,509,379 A | 4/1996 | Hoeschen |
| 5,544,620 A | 8/1996 | Sarkissian |
| 5,551,375 A | 9/1996 | Flores |
| 5,592,900 A | 1/1997 | Kakuta |
| 5,636,593 A | 6/1997 | Vito |
| 5,662,066 A | 9/1997 | Reitz |
| 5,749,318 A | 5/1998 | Barbot et al. |
| 5,752,465 A | 5/1998 | Page |
| 5,791,288 A | 8/1998 | Ehrler |
| 5,931,119 A | 8/1999 | Nissim et al. |
| 6,079,364 A | 6/2000 | Tamba |
| RE36,847 E | 9/2000 | Waters |
| 6,126,015 A | 10/2000 | Haymaker |
| 6,202,595 B1 | 3/2001 | Atcravi |
| 6,205,954 B1 | 3/2001 | Bogaerts |
| 6,234,112 B1 | 5/2001 | Emery |
| 6,286,457 B1 | 9/2001 | Sugahara |
| 6,286,459 B1 | 9/2001 | Parr |
| 6,378,461 B1 | 4/2002 | Thaler et al. |
| 6,401,660 B1 | 6/2002 | Wolff |
| 6,401,661 B1 | 6/2002 | Emery |
| 6,453,844 B1 | 9/2002 | Janzen et al. |
| 6,457,435 B1 | 10/2002 | Bridges |
| 6,463,881 B1 | 10/2002 | Reitz |
| 6,494,167 B1 | 12/2002 | Chen |
| 6,561,131 B1 | 5/2003 | Schwartz |
| 6,568,348 B1 | 5/2003 | Bedard |
| 2002/0139312 A1 | 10/2002 | Reitz |
| 2002/0162514 A1 | 11/2002 | Billi et al. |
| 2003/0217700 A1 | 11/2003 | Northrop et al. |

FOREIGN PATENT DOCUMENTS

| | | |
|---|---|---|
| DE | 3913896 A1 | 10/1990 |
| EP | 0 102 861 A1 | 3/1984 |
| EP | 0 159 595 A1 | 10/1985 |
| EP | 0 297 015 A1 | 12/1988 |
| EP | 0 399 854 A1 | 11/1990 |
| EP | 0 377 414 B1 | 5/1993 |
| FR | 2 569 526 A1 | 3/1986 |
| FR | 2 648 313 A1 | 12/1990 |
| FR | 2 693 872 A1 | 1/1994 |
| FR | 2 602 643 A1 | 2/1998 |
| JP | 4117227 A2 | 4/1992 |
| WO | WO 83/00980 A1 | 3/1983 |
| WO | WO 98/49891 A1 | 11/1998 |
| WO | WO 03/051105 A1 | 6/2003 |

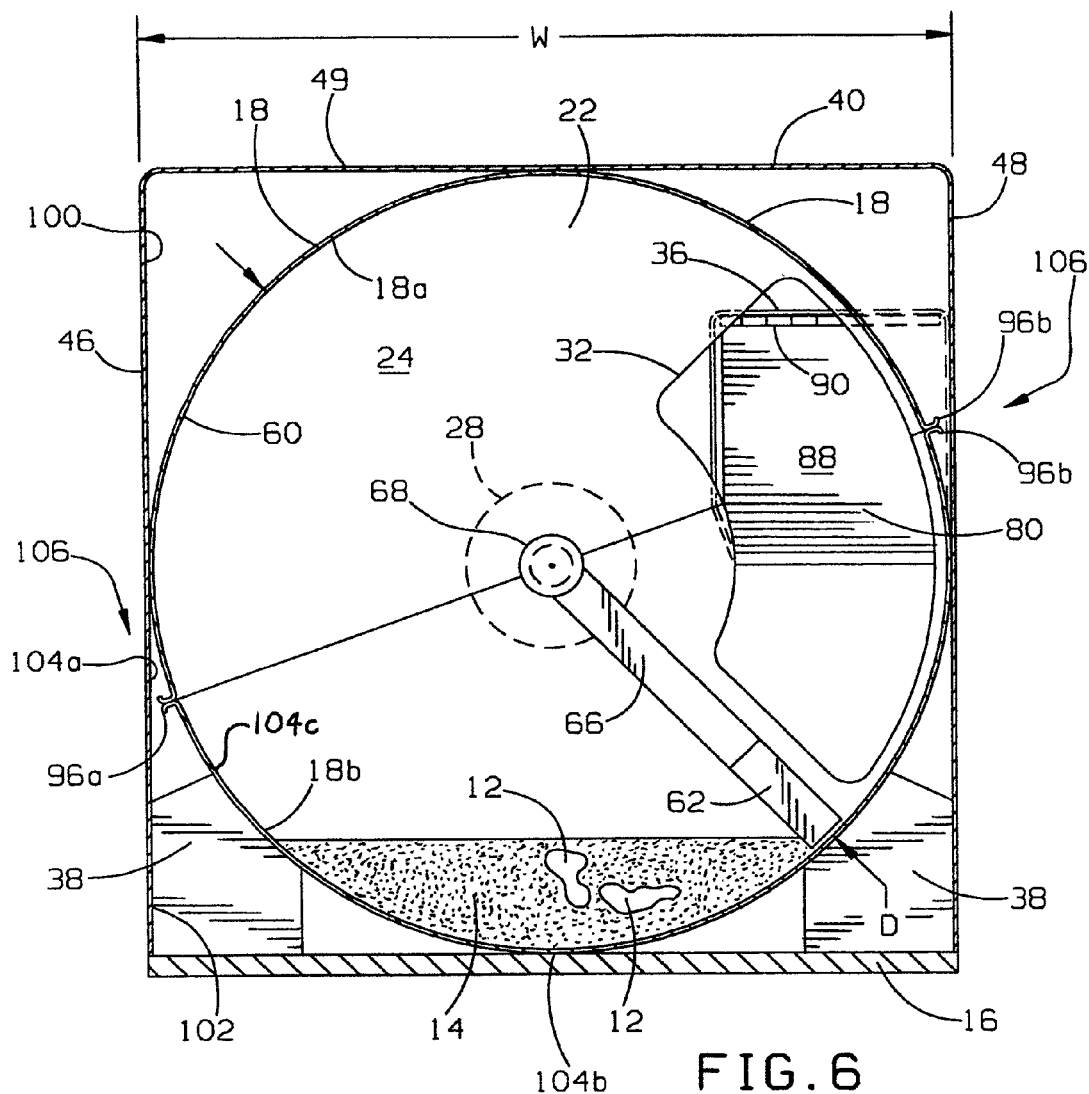
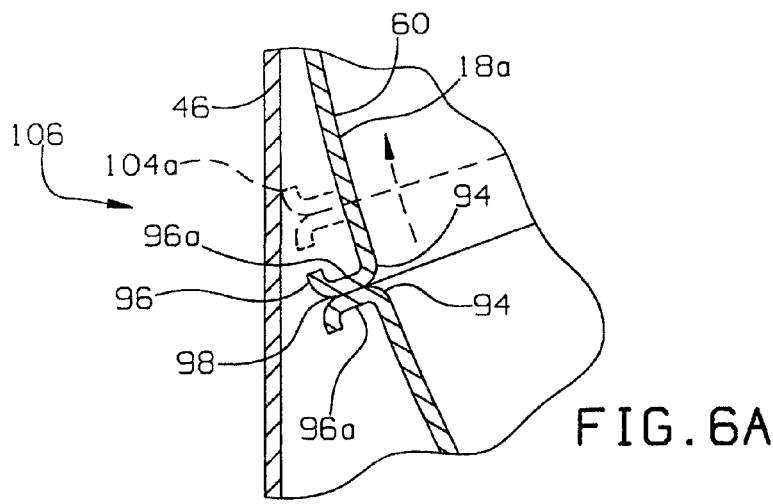
FIG.6
FIG.6A

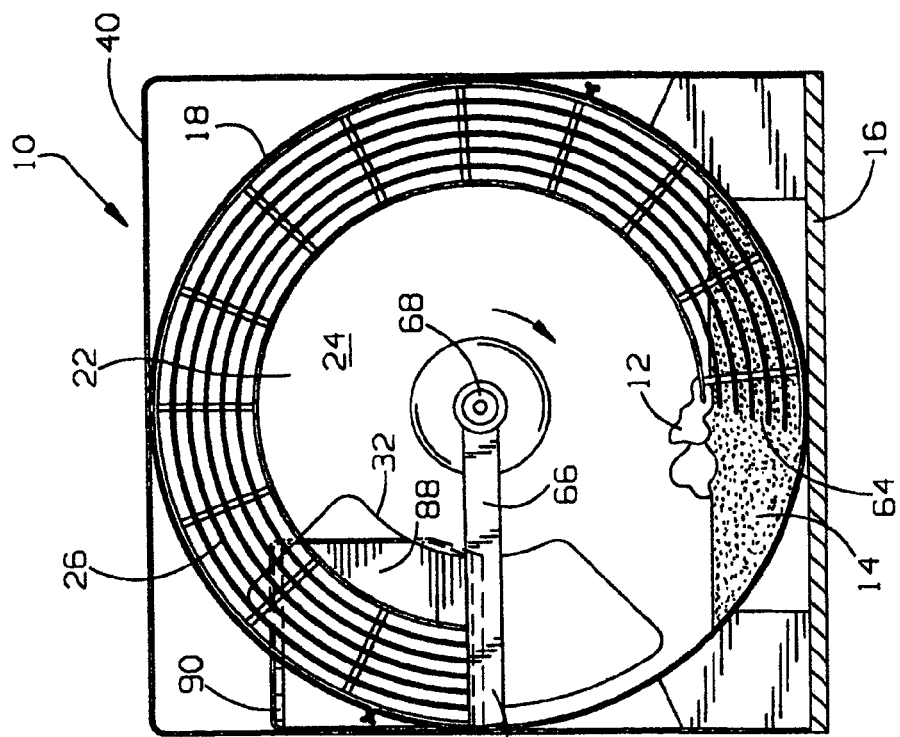
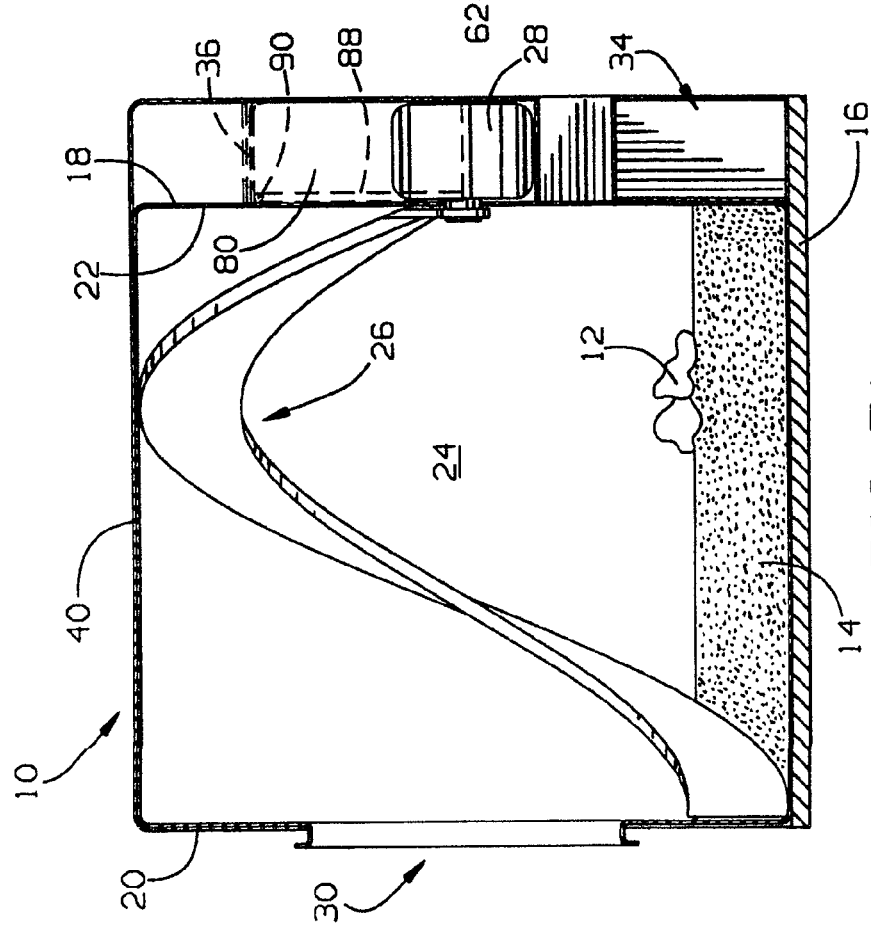

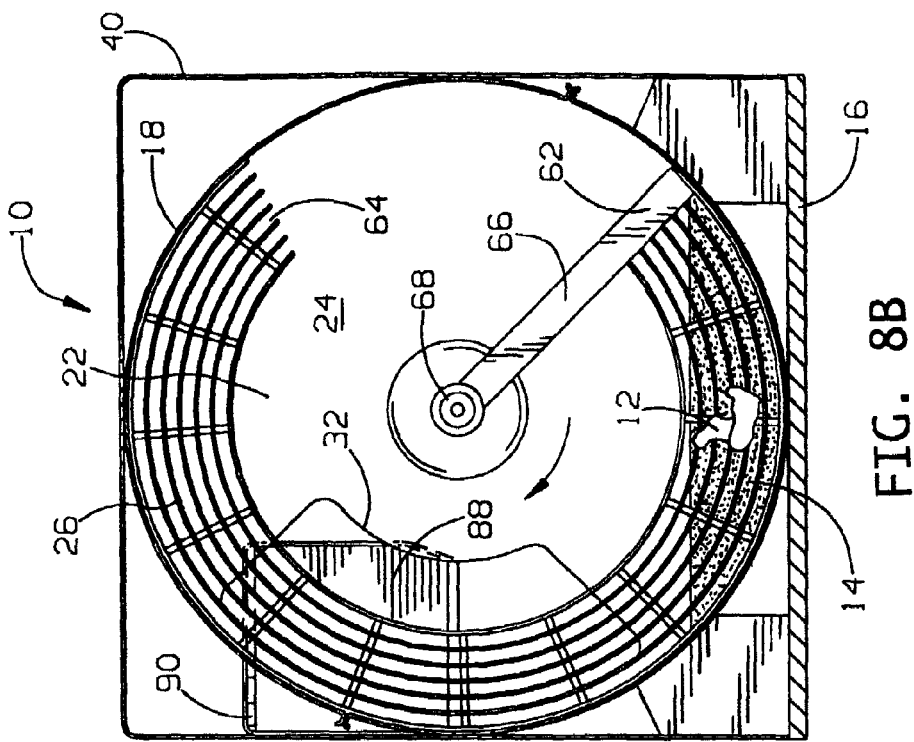
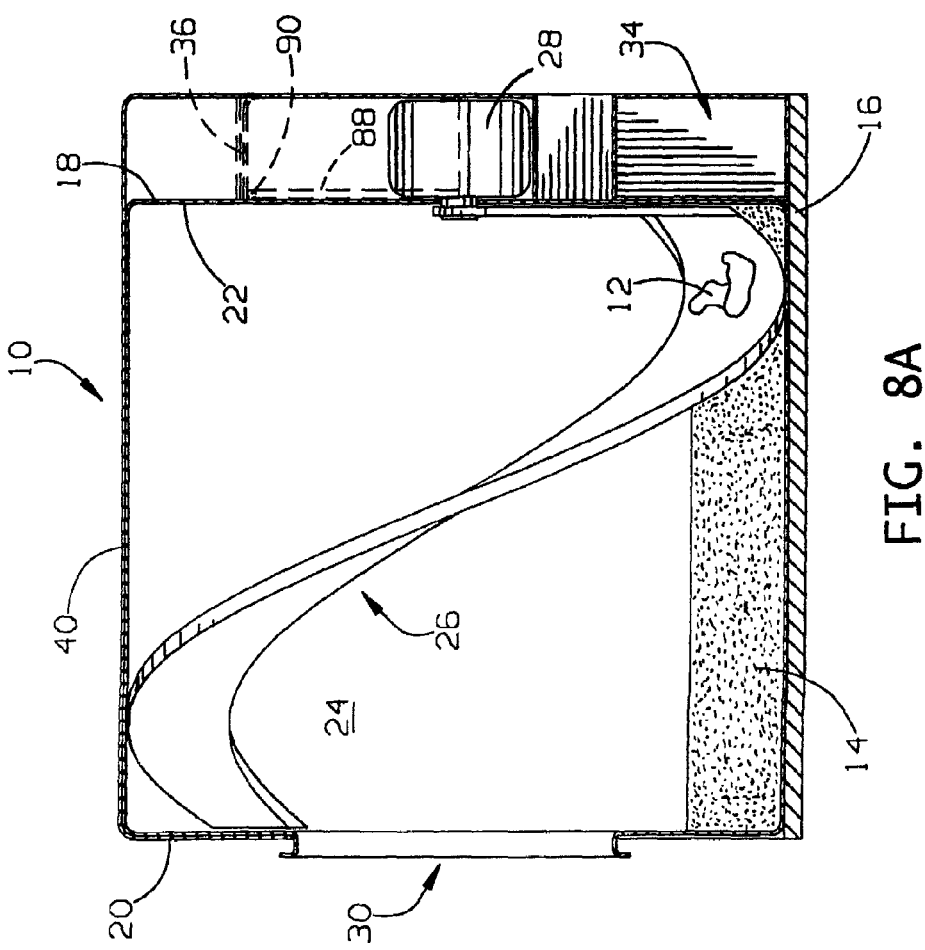

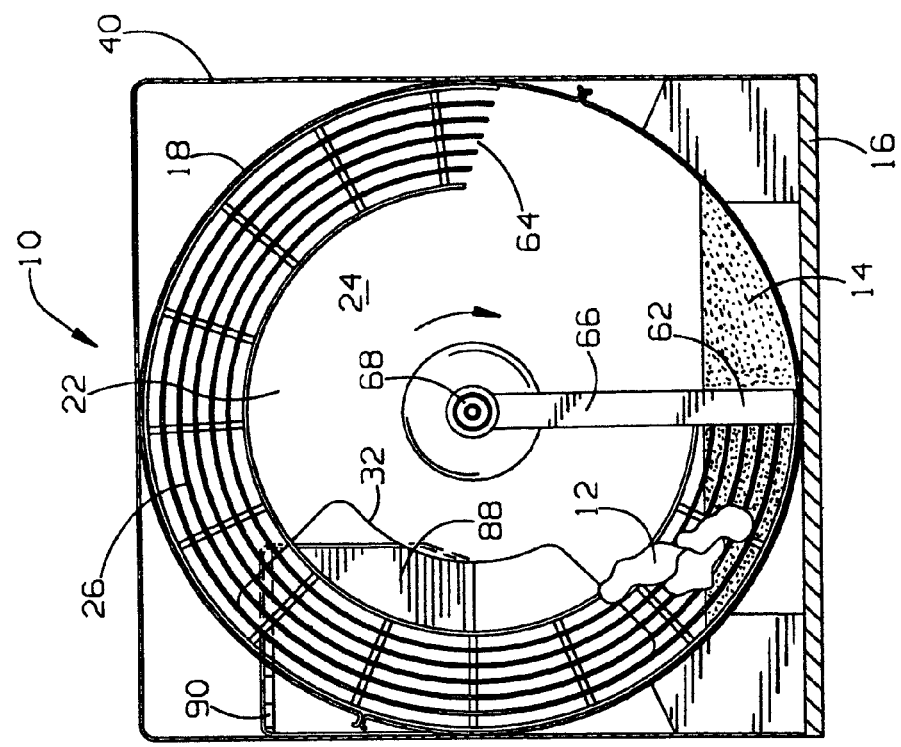
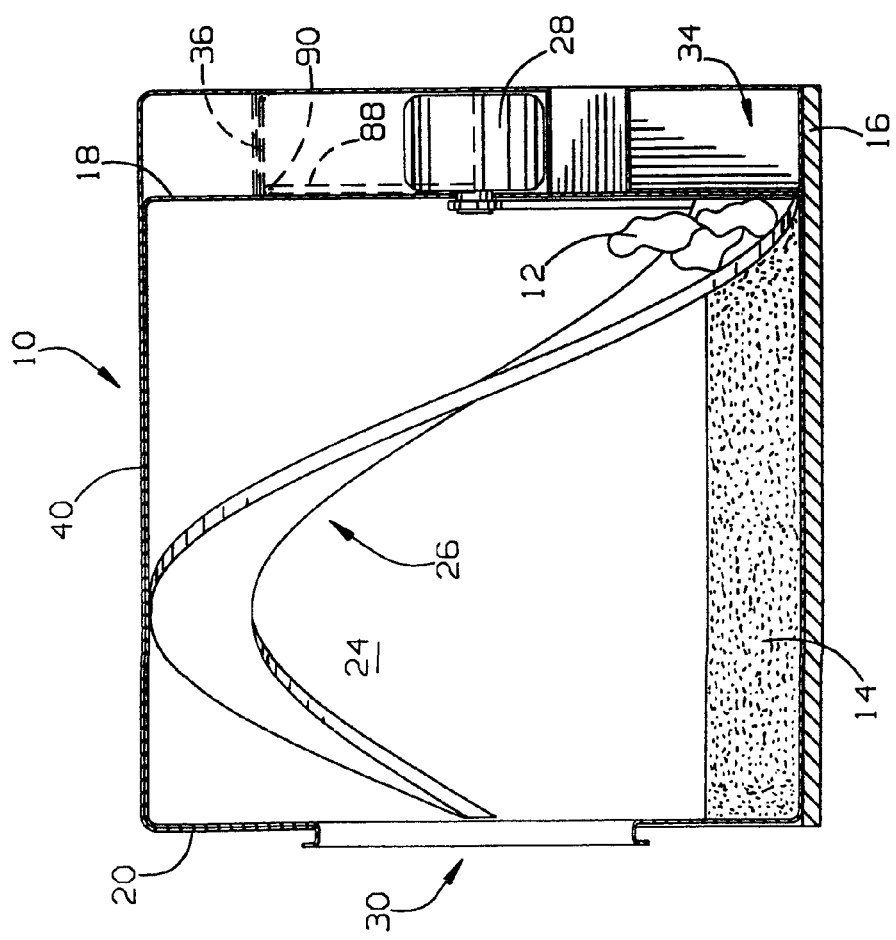
FIG. 9B
FIG. 9A

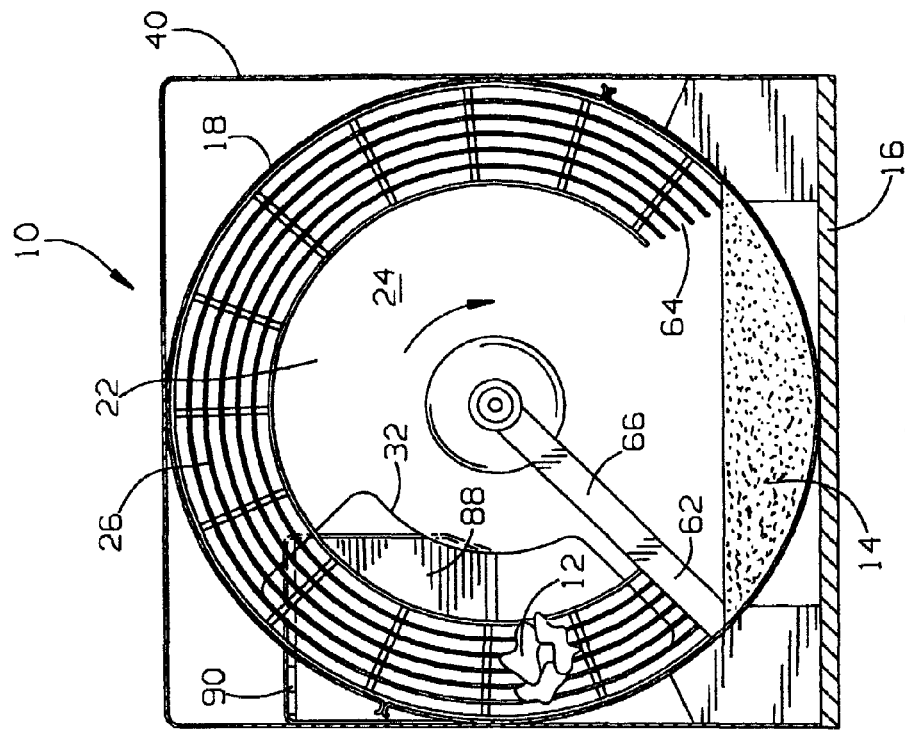
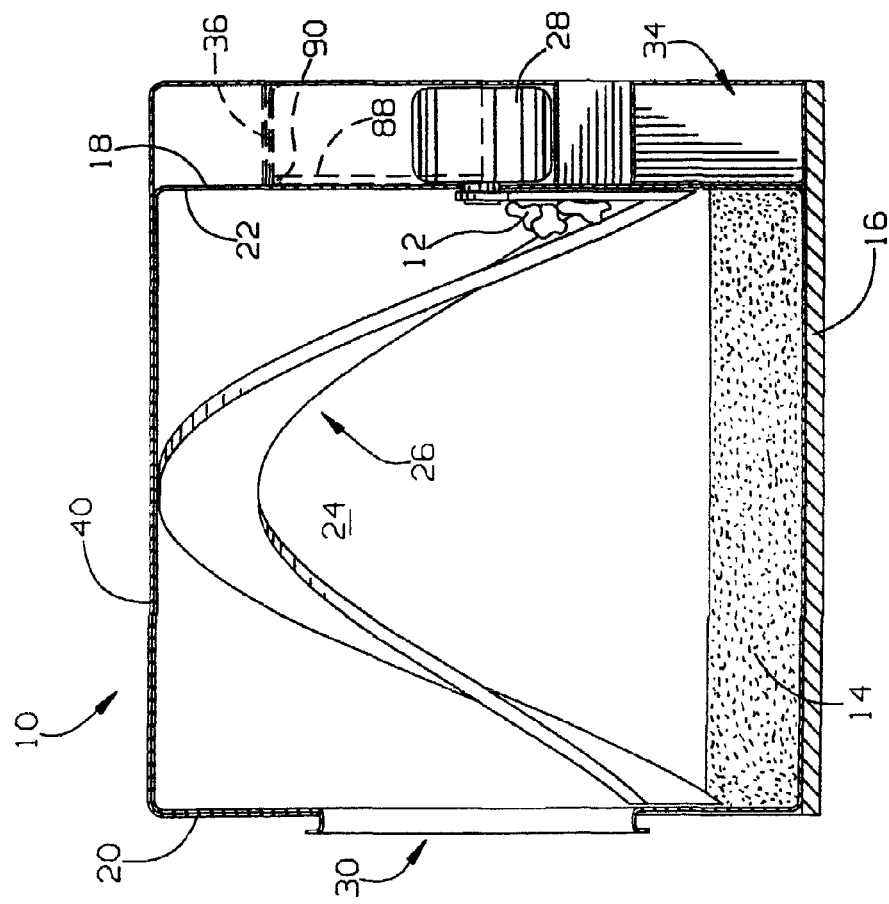
FIG. 10B
FIG. 10A

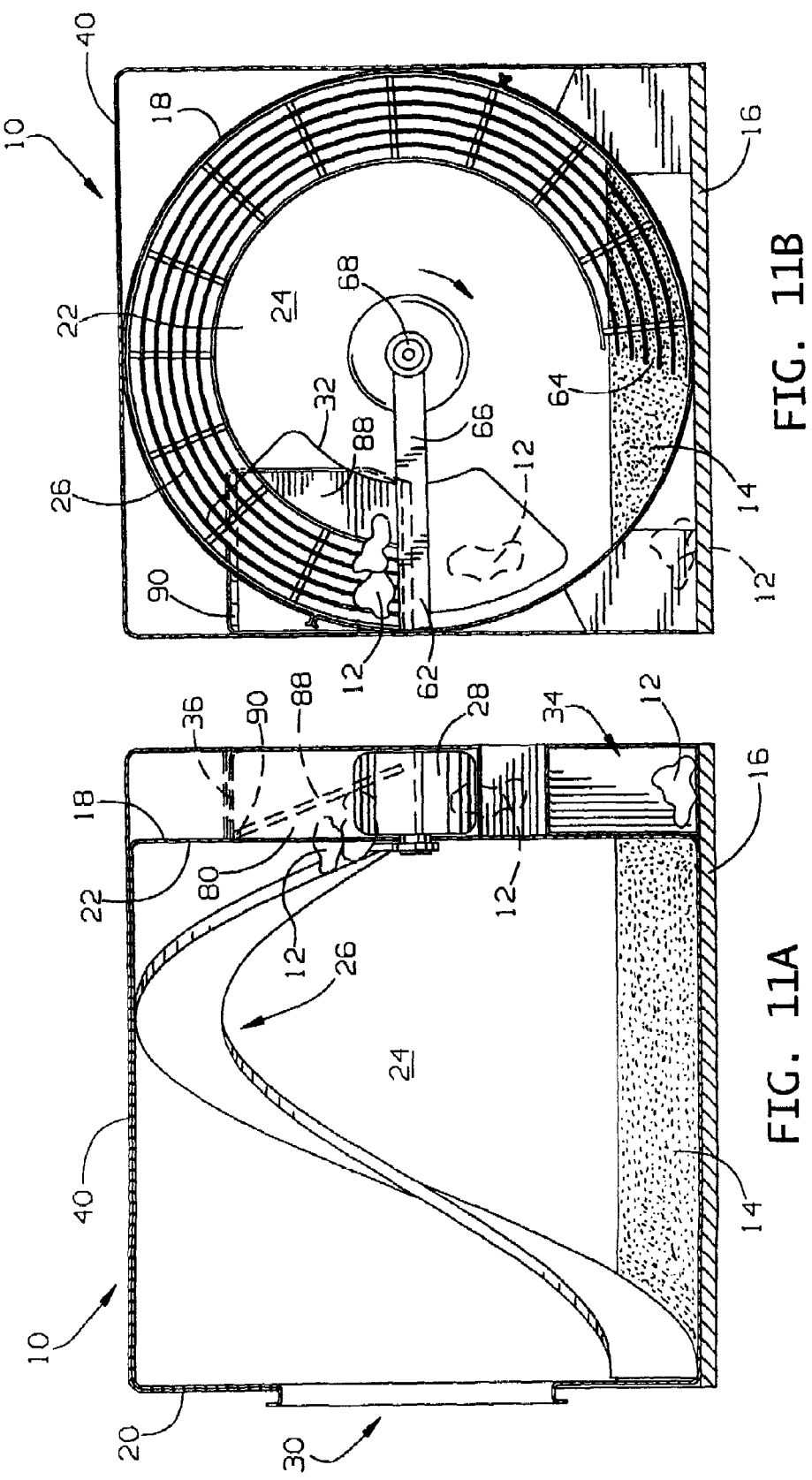

APPARATUS AND METHOD TO REMOVE ANIMAL WASTE FROM LITTER

FIELD OF THE INVENTION

The invention relates to a litter receptacle for holding animal waste, and in particular, a self-cleaning litter receptacle and method of removing animal waste from a litter receptacle.

BACKGROUND OF THE INVENTION

Conventional self-cleaning litter receptacles usually are open-top boxes that hold granular litter. Some litter boxes automatically remove animal waste from the litter, typically by using a motor to drive a sifting structure, such as a rake or scoop, through the litter to separate the waste from the litter. The motor must provide enough power to overcome the weight and agglomeration (i.e., adherence between litter grains) of the litter to push the rake through the litter, especially when starting the motion of the rake.

Prior self-cleaning litter receptacles can also take the form of a drum or other enclosure that holds the litter. For instance, U.S. Pat. No. 5,048,464, issued to Shirley, and U.S. Pat. No. 6,286,457, issued to Sugahara, both disclose a litter box with a motor that drives a drum for rotation that, in turn, rotates a helical-shaped screen or spiral filter attached to the sides of the drum for sifting through the litter. Use of a drum is advantageous because the drum keeps litter from escaping the litter box while it is rotating, and minimizes the unpleasant odors that emanate from typical open-top litter boxes. A rotating drum or cylinder, however, increases the power requirements of the motor because the motor is required to power the entire weight of the drum or other bulky enclosure for rotation as well as having to overcome the weight of the litter and waste contained therein.

Since the motor can be the most expensive component in the entire system, a self-cleaning litter receptacle that minimizes the power requirements of the motor while still sufficiently separating the animal waste from the litter would be desirable.

SUMMARY OF THE INVENTION

In accordance with one aspect of the invention, a generally cylindrical enclosure is provided for containing litter, and a separating device such as a helical rake is disposed in the cylindrical enclosure for separating animal waste from the litter in the enclosure. Rather than rotating the cylindrical enclosure, a rotary drive is provided that rotates the separating device to move relative to the enclosure and litter therein. Since the relatively heavy weight of the cylindrical enclosure and litter need not be constantly rotated by the rotary drive, the power requirements therefor can be kept to a minimum.

In accordance with another aspect of the invention, a litter receptacle is provided, and a sifting member is driven through the litter in the receptacle. A support for the receptacle allows the receptacle to move due to the sifting member being driven through litter in the receptacle. Accordingly, when the sifting member initially encounters agglomerates stuck to the receptacle surface, it does not have to completely separate the agglomerates before it can continue to be driven through the litter since the receptacle and stuck agglomerates can move with the sifting member. In other words, the drive force applied to the sifting member need not be so large that it initially has to overcome the frictional force between the sticky agglomerates and the receptacle since the receptacle is supported for movement in the direction the sifting member is driven. Rather, in a preferred form, the receptacle is provided with a predetermined amount of movement before a stop acts to cease continued movement of the receptacle. However, at this point, the drive has already started shifting the sifting member so that any stuck agglomerates at the sifting member have inertia forces associated therewith that will assist in dislodging them from the receptacle, unlike the situation at start-up of the sifting member drive.

In a preferred form of the invention, a cylindrical drum and a helical rake in the drum are provided. The drum is rotatably mounted via a rotary support such as rotary bearings or the like, and a rotary drive drives the helical rake for rotation in the drum. A stop is arranged so that the drum rotates by only a predetermined, limited amount, e.g., about 20 to about 180 degrees. Preferably, the drum rotates about 25 degrees. The limited rotation amount afforded the drum keeps power requirements for the rotary drive to a minimum, particularly at start-up when frictional forces between the sticky agglomerates and the inner drum surface will typically be at their highest.

BRIEF DESCRIPTION OF THE DRAWINGS

FIG. 6 is a cross-sectional view taken along line 6-6 of FIG. 3 showing a rear wall of the drum and an opening therein for removing the animal waste from the chamber.

FIG. 6A is a enlarged view from FIG. 6 showing a stop formed between the drum and an outer stationary housing;

FIGS. 7A-11B are side and corresponding end cross-sectional views of the interior of the drum showing various stages of a cleaning cycle with the sifting member removing animal waste from the chamber;

DETAILED DESCRIPTION OF THE PREFERRED EMBODIMENTS

Figure 1:
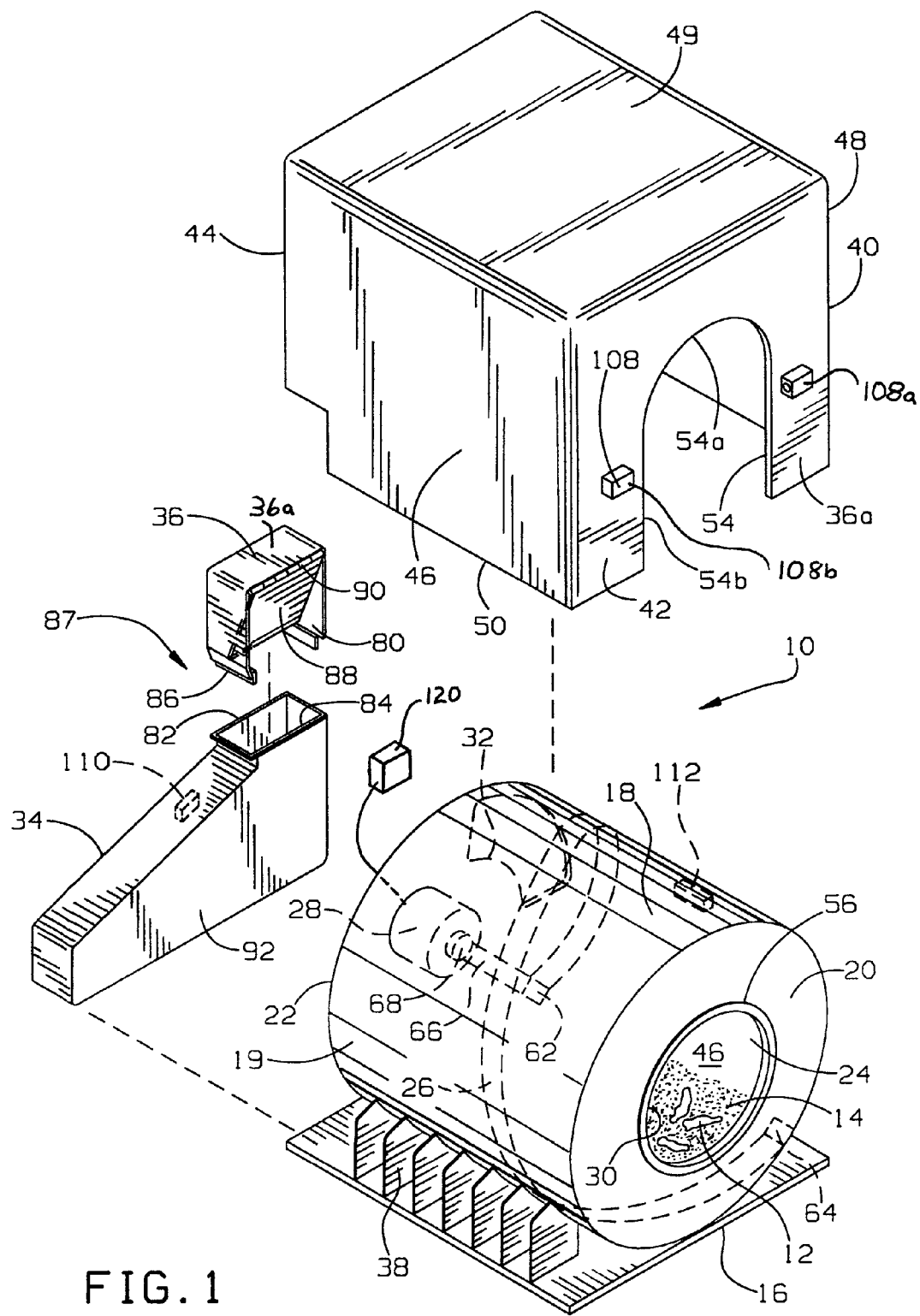
FIG. 1 is an exploded, front perspective view of an apparatus for removing animal waste from a quantity of litter in accordance with the present invention showing a cylindrical drum in which litter is contained.

Referring to FIG. 1, an apparatus 10 for removing animal waste 12 deposited in a quantity of litter 14 is illustrated. The illustrated apparatus 10 includes a base 16 and a litter receptacle 18, preferably an enclosure such as a cylindrical drum, mounted on the base 16. As used herein, the animal waste 12 may include any bodily excretions whether liquid or solid that may be deposited in the litter 14. The waste 12 may be just the waste itself, or may be the animal waste 12 combined with the litter 14, such as when liquid and solid waste matter combines with the litter to form a clumped mass of waste and litter agglomerates.

The preferred and illustrated cylindrical drum receptacle or enclosure 18 includes a generally cylindrical side wall 19 extending between opposing front and rear end walls 20 and 22, respectively. The drum 18 has an internal chamber 24 formed by the walls 19, 20, and 22 and in which the litter 14 is contained, generally at the bottom thereof. A separating device 26 is provided in the chamber 24 for separating the animal waste 12 from the litter 14 when moved through the litter 14 in the chamber 24. The separating device 26 can be a sifting member, such as a helical rake, that is driven by a rotary drive 28, such as a motor, connected to the separating device 26.

In order to minimize the size or power requirements of the rotary drive 28, the separating device 26 is turned or rotated relative to the drum 18. That is, the drive 28 moves the separating device relative to the enclosure or receptacle 18, which in the illustrated form is a cylindrical drum, but other configurations for the receptacle 18 could also be employed. In this manner, the rotary drive 28 generally does not need to rotate the relatively heavy weight of the drum 18 and litter 14 contained therein. The rotary drive 28, therefore, has a reduced peak power or maximum horse power/torque rating that is significantly less than what would be needed to continuously rotate the drum 18, separating device 26, and litter 14 at the same time.

The drum 18 is also rotatably mounted to the base 16 such that the drum 18 can rotate as an incident of rotation of the rake 26 therein for an initial, limited angular amount. Preferably, the drum 18 is free to rotate on the base 16 about a longitudinal axis Z (FIG. 3) from its initial start-up, rest position for a distance of about 20 to about 180 degrees. Preferably, the drum rotates less than about 90 degrees, such as about 25 degrees. To that end, support 38 is provided that allows the drum 18 to rotate for the limited angular distance as a result of the separating device 26 being moved or shifted through the litter 14. That is, while the rotary drive 28 directly rotates the separating device 26 (as more fully described below), an interference or engagement between the separating device 26 and the litter 14 and/or the stuck animal waste 12 may cause the drum 18 to rotate along with the separating device 26 about the support 38. Further, the helical rake 26 may be disposed in the drum chamber 24 such that a radially outer edge 76 of the rake 26 is closely adjacent to or in scraping engagement with the inner surface 60 of the cylindrical drum wall 19. If in engagement with the wall 19, rotation of the rake 26 in the drum 18 may also generate limited rotation of the drum 18, if the strength of the frictional forces therebetween are greater than that of forces tending to overcome these frictional forces such as the weight of the drum 18 and litter therein. Such drum rotation may also occur with the scraping edge 76 closely spaced to the wall 19. The drum 18, therefore, may be indirectly rotated by the rotary drive 28 via rotation of the separating device 26. Such configuration is advantageous in keeping the power requirements for the rotary drive 28 to a minimum because the rotary drive 28 also does not need to overcome any large, initial frictional or adherent forces between the drum 18, litter 14, and/or animal waste 12 as may be encountered if the separation device 26 was moved in a fixed receptacle. In addition to being less costly to purchase, such smaller rotary drive 28 is advantageous in that the device 28 weighs less, is quieter, and is more cost efficient to operate.

In this manner, the rotary drive 28 does not need to overcome the full frictional or adherent forces that typically will form between the drum side wall 19 and agglomerates of animal waste 12 and litter 14 that may be stuck to drum inner surface 60. It should also be noted that the rake 26 and drum 18 need not rotate together in precision at the same rate. Instead, it is conceivable that the rake 26 can rotate faster than the drum 18 even though the drum 18 is also being rotated by rotation of the rake 26 therein. In this instance, the rake 26 may be encountering pockets of frictional resistance at different locations in the litter 14 that it overcomes as it is driven therethrough so that the drum 18 may not rotate in synch with the rotation of the rake but may stop or slow down occasionally depending on the frictional forces the rake 26 is encountering at any one time during its rotation through the litter. In any event, at no time will the point 104*b* located at the bottommost position at the initial, rest position of the drum 18 rotate beyond the limited angular amount, e.g., 90 degrees, as previously mentioned and as will be described more fully hereafter. The present apparatus 10 takes advantage of these frictional forces so that the rotary drive force applied to the rake 26 is transmitted to the drum 18 at the inner surface 60 therebetween. In this manner, the drum 18 can rotate with the rake 26 for the limited angular distance, as previously described. When the rotary drive force exceeds the frictional force, generally the rake and drum will no longer rotate together. As a result, it is believed that the peak power requirements of the rotary motor drive 28 can be maintained at about less than half of that required by a configuration that uses a rotating or otherwise moving sifting member in a fixed, non-rotating drum or other enclosure.

With such configuration, the apparatus 10 only needs a very small rotary drive 28. For example, a small 6 volt DC gear-drive motor that can operate on D-cell batteries (i.e., about 6 D-Cell batteries) or a suitable wall transformer that converts AC to DC power (i.e., a 115 Volt AC to 6 volt DC converter). In such form, the rotary drive 28 preferably has less than about 0.1 horsepower, and most preferably about $\frac{1}{50}$ horsepower. Such a motor is suitable to rotate the rake 26 within the drum 18 at about 2 RPM.

As mentioned above, any concurrent rotation between the drum 18 and the separating device 26 may cease when the separating device 26 exceeds the opposite forces of the litter 14 and the drum wall 19, such as frictional, adherent, or gravitational forces. These forces may be exceeded, in one instance, upon shifting of the litter 14 within the chamber 24. For example, upon sufficient rotation of the drum 18, the litter 14 therewithin may shift or move in the chamber 24 due to gravity. Upon sufficient shifting or movement of the litter 14 within the chamber 24, the forward rotational force of the separating device 26 then overcomes the opposite frictional and other forces to permit the separating device 26 to begin rotation relative to the drum 18. Thereafter, the separating device 26 continues its rotation relative to the drum 18 while the drum is relatively stationary.

If the frictional or adherent forces are not overcome by the rotating separating device 26 before position 104*a* on drum 18 is turned by the limited angular amount, the rotation of the drum 18 will be stopped by a stop 106. The stop 106 may be a mechanical or electrical stop. The stop 106 halts the rotation of the drum 18, but permits the separating device 26 to continue its rotation thereafter. The stop 106 may be formed between the drum 18 and an outer, fixed housing 40 (FIG. 6A), or other fixed member such as the base 16. After engagement of the stop 106, the drum 18 may remain in place or may fall back to or toward its original, rest position. The separating device 26 can then more thoroughly sift the litter 14 by its rotation relative to the drum 18.

The animal waste 12 is removed from the chamber 24 through the initiation of a cleaning cycle. A typical cleaning cycle includes the rotary drive 28 moving the separating device 26 within the chamber 24 both concurrent with and relative to the cylindrical side wall 19 as described above. The rotation permits the separating device 26 to sift through the litter 14 within the chamber 24 and remove the animal waste 12 from the litter 14. Upon further rotation of the separating device 26, the animal waste 12 is also removed from the drum 18 itself.

Figure 2:
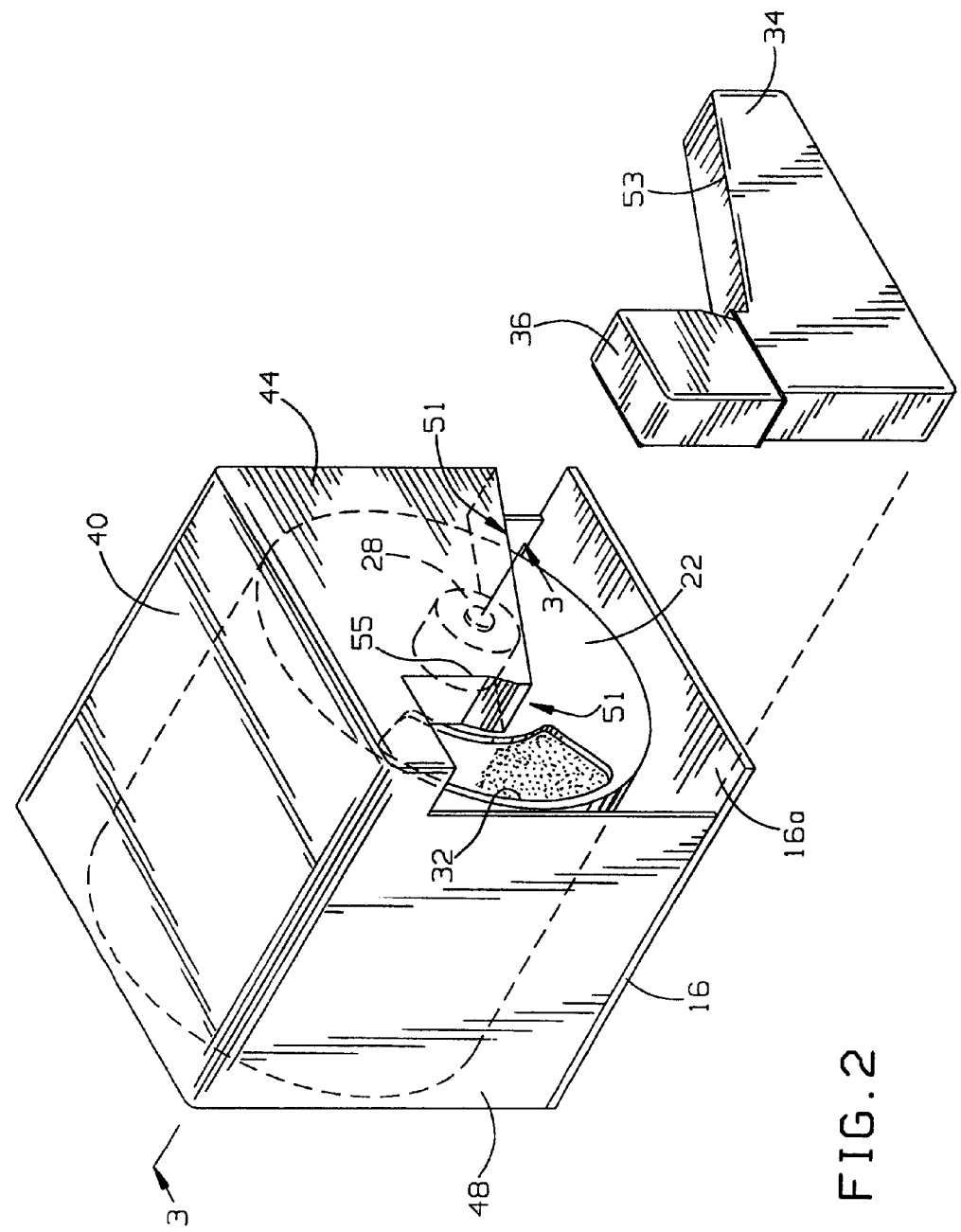
FIG. 2 is a partially exploded, rear, perspective view of the apparatus of FIG. 1 showing a storage container for receipt of animal waste from the drum.
Figure 3:
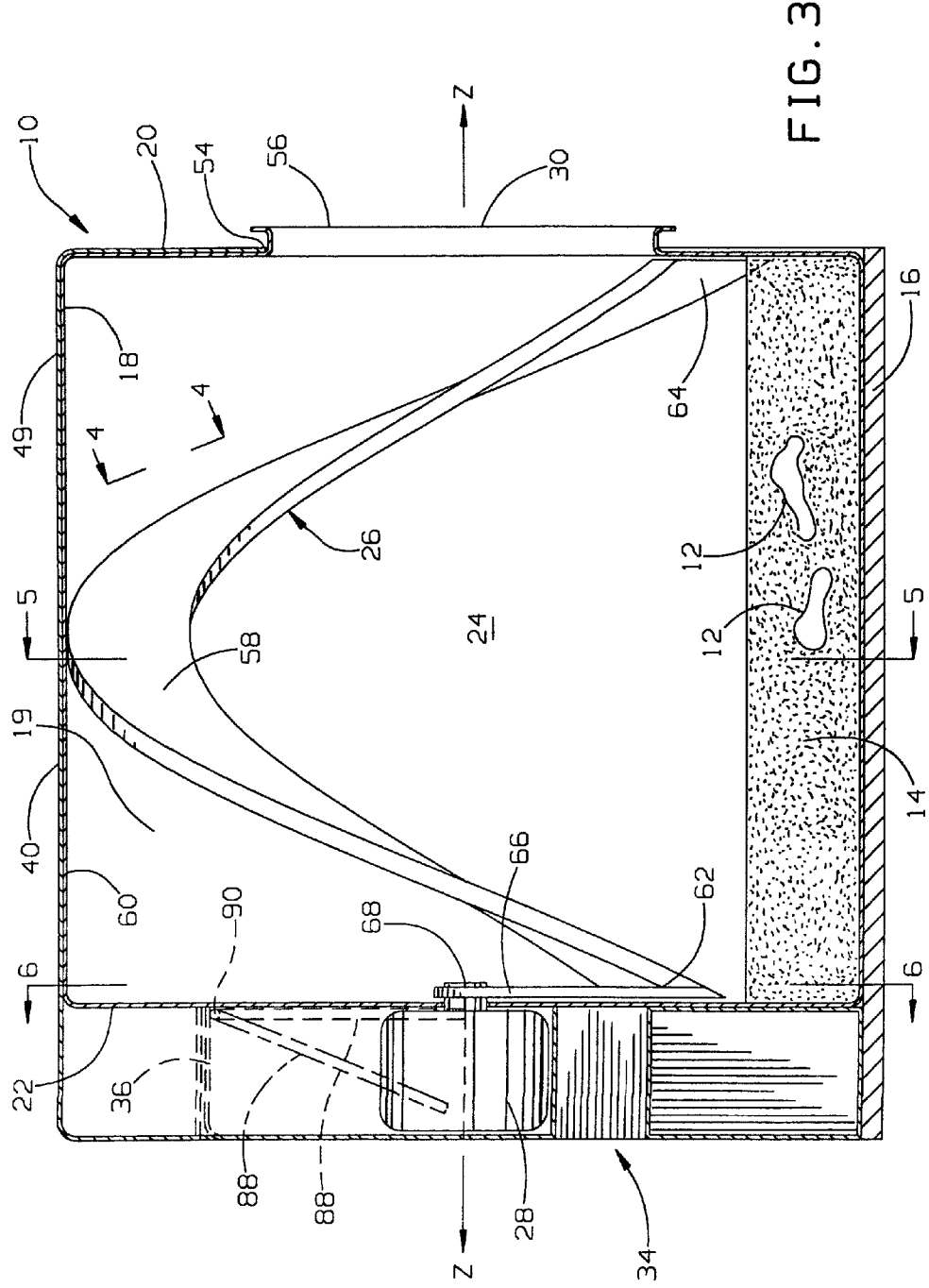
FIG. 3 is a cross-sectional view taken along line 3-3 of FIG. 2 showing a helical sifting member within the chamber.

Referring to FIGS. 1-3, the drum 18 is preferably a cylindrical enclosure that includes a front opening 30 in the drum front wall 20 that is sized to allow a domestic animal, such as a cat, to enter the chamber 24 in order to urinate or defecate depositing such waste 12 in the litter 14. The drum also includes a rear opening 32 defined in the drum rear wall 22 that is sized to receive the waste 12 and agglomerates of waste 12 and litter 14 from the separating device 26 during the cleaning cycle to remove the waste 12 from the chamber 24. As has been mentioned, while the chamber 24 is shown as being cylindrical, other configurations may also be used so long as the separating device 26 is able to sift through the litter 14 and remove the waste 12 from the chamber 24.

As shown on FIGS. 1-2, a removable storage container 34 is mounted on bottom wall 16a of the base 16 at the rear wall 22 of the drum 18. The storage container 34 communicates with chamber 24 through the rear opening 32 and a discharge chute 36 to receive the waste directed through the rear opening 32 by the separating device 26. In one embodiment as shown on FIG. 2, the chute 36 is removable with the storage container 34 to keep odors from leaking from the storage container 34 (as explained in detail below) when the storage container 34 is removed. Alternatively, the chute 36 is fixed to the drum 18 so that only the storage container 34 is removable. In either instance, a user can remove the waste at any time or wait until the storage container 34 is full while the litter 14 within the chamber 24 is automatically kept clean.

In the preferred and illustrated form, the support for rotatably mounting the drum 18 is the base 16. Alternatively, the support for the drum 18 can be rotary bearing assemblies such as including a central rear axle extending out from the rear drum wall to be fixed to the outer housing 40 or other fixed structure such as the motor 28, as will be described hereinafter. In the illustrated from in FIGS. 1 and 6, the base 16 has support fins 38 extending upward from the bottom wall 16a to upper arcuate edges 38a having substantially the same curvature as the outer, cylindrical surface of the drum, with the fins aligned along both sides of the base 16 in order to avoid lateral shifting of the drum 18 and to keep it in alignment with the separating device 26. It is also contemplated that the fins 38 may include wheels, bearings, or the like to allow the drum 18 to rotate easily. Further, any engaging surfaces of the drum, base, and fins are preferably of low friction material for ease of drum rotation.

Referring again to FIGS. 1-3, a removable housing 40 is provided to enclose the apparatus 10. The housing 40 includes a front wall 42, rear wall 44, and left and right side walls 46, 48 respectively; all four walls extend downwardly from a top wall 49. When covering the drum 18, a bottom peripheral edge 50 of the housing 40 rests on the base wall 16a. The housing 40 is preferably removable from the base 16 for cleaning, repair, or maintenance of the apparatus 10. The housing 40 is preferably made of plastic, or any other material that traps the odors from the waste 12 within the housing, and should be strong enough to at least withstand the impact of a small animal jumping on or pushing against it.

As best shown in FIG. 2, one embodiment of the apparatus 10 includes a cut-out 51 in the housing 40 that extends along the rear and sidewalls 44, 46 and 48 to align with a periphery 53 of the storage container 34 so that a user can change the storage container 34 without the need of lifting the housing 40. The housing 40 need not include the cut-out 51 so that it covers the storage container 34 and so that the housing 40 must be lifted off the base 16 in order to empty the storage container 34. Rather than cut-out 51, a partial cut-out may be provided so that the housing 40 covers most of the storage container 34 while exposing enough of the location reserved for the storage container 34 so that a user can quickly determine whether or not the storage container is in place for operation.

As discussed previously, the chute 36 may be removable with the storage container 34. In this case, the rear wall 44 and the right side wall 48 would have a periphery 55 that corresponds to the shape of the chute 36 as shown in FIG. 2. The chute 36 may also be separately removable from the housing 40 through the cut-out 51 either before or after the storage container 34 is removed from the housing 40.

As illustrated in FIG. 1, the housing 40 includes a front opening 54 in the front wall 42 in the shape of an arched doorway. The opening 54 is sized so that the upper curved edge portion 54a thereof is generally aligned with the corresponding upper, curved portion 30a of the chamber front wall opening 30, and the parallel side edge portions 54b have a width therebetween corresponding to the diameter of the opening 30 in order to permit the animal to pass through the housing 40 and into the chamber 24 without having to fit through a smaller or misaligned housing opening 54 relative to the chamber opening 30.

As best seen in FIG. 3, the chamber front end wall 20 has an outwardly projecting, circular flange 56 that extends about the chamber front wall opening 30. The housing 40 slides over the drum 18 so that edge portions 54a and 54b fit between the flange 56 and the front end wall 20, to securely fit the housing 40 over the drum 18. The flange 56 provides a smoothly contoured surface at the edge of the front opening 54 to eliminate any rough or sharp edges that may scratch or otherwise injure the animal as it enters the apparatus 10. It will be appreciated that the shape of the front openings 30 and 54 is not limited to that described as long as the openings permit an animal to enter the apparatus 10.

Referring again to FIG. 3, the drum 18 has a central, rotational Z-axis. Preferably, the front chamber opening 30 is coaxial with the longitudinal Z-axis so that no matter what the rotational position of the drum 18, the opening 30 will always be located in the same approximate position relative to the bottom of the chamber 24 so that the opening 30 is always conveniently positioned for the animal.

Figure 4:
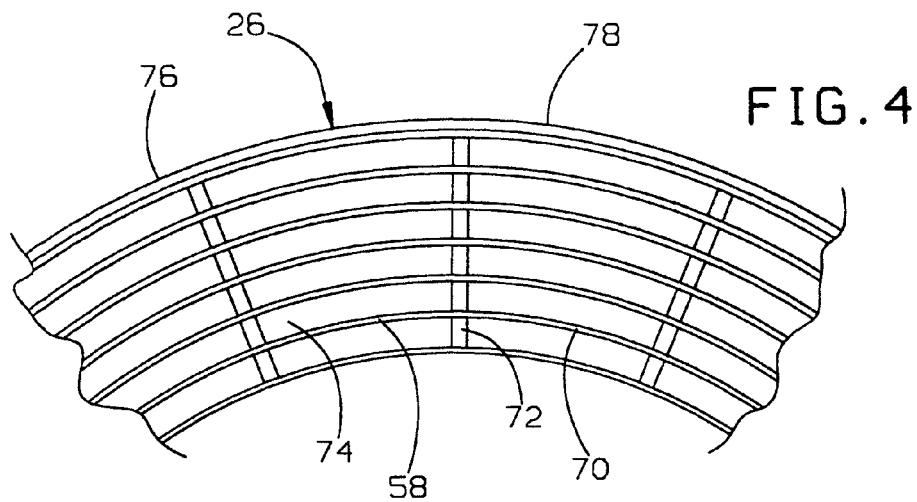
FIG. 4 is an enlarged view taken along line 4-4 of FIG. 3 showing the construction of the sifting member.
Figure 5:
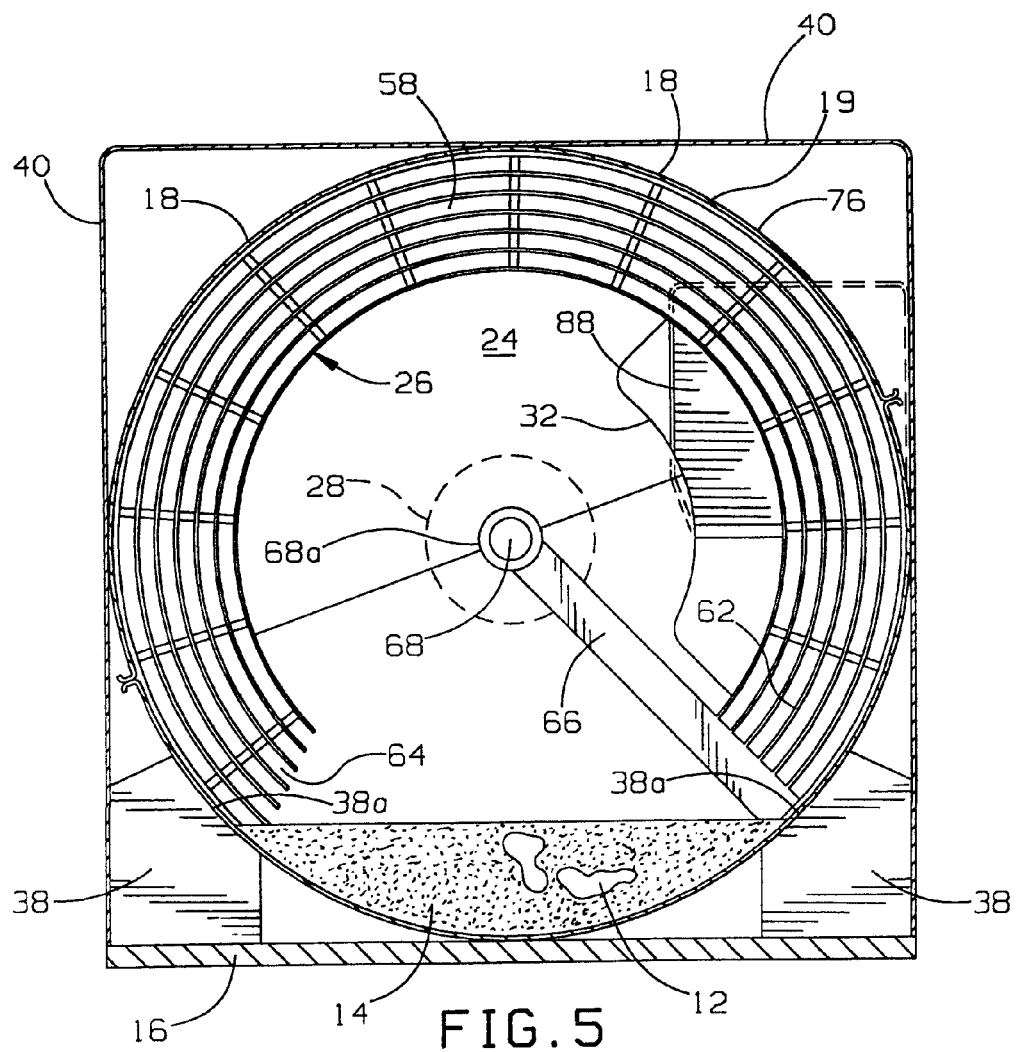
FIG. 5 is a cross-sectional view taken along line 5-5 of FIG. 3 showing a direct drive transmission between a motor and the sifting member.

Referring to FIGS. 3-5, the separating device 26 is preferably an auger-shaped structure, such as an elongate, generally helical blade or rake 58 that spirals along an inner surface 60 of the chamber side wall 19 from the rear end wall 22 to the front end wall 20. The separating device 26 has a first end 62 positioned adjacent the rear end wall 22 and a second end 64 adjacent the front end wall 20. The first end 62 of the separating device 26 is spaced from the Z-axis along the rear end wall 22, and is connected to the rotary drive 28 via a coupling in the form of a radially extending drive bar 66. The drive bar 66 is in turn connected to a rotatable drive shaft 68 extending out of the rotary drive 28 and through rear end wall 22. As shown in FIG. 3, the rotary drive 28 is mounted behind the rear end wall 22 so that the drive shaft 68 extends into the chamber 24 coaxially with the Z-axis. It will be understood that the rotary drive 28 can be mounted to the rear wall 44 of the housing 40 or have any other support structure between the rear wall 44 and the chamber rear end wall 22, as long as the drive shaft 68 can extend into chamber 24 to rotate the separating device 26. In this regard, the shaft 68 can serve as the previously-mentioned support axle for the drum 18 with a rotary bearing fit in the rear opening 68*a* of the end wall and through which the shaft 68 extends. In this instance, the motor 28 is mounted to the drum 18 and not the housing 40 so that the motor 28 stays with the drum 18 upon removal of the housing 40 therefrom.

As the rotary drive 28 rotates the drive shaft 68, the drive bar 66 turns to rotate or turn the separating device 26 about the Z-axis, along the chamber wall 19 and through the litter 14 residing in the chamber 24. The second end 64 of the separating device 26 is free to move along the front end wall 20 or may be joined to an optional circular track or rotating plate (not shown) disposed on the front end wall 20.

Referring to FIG. 4, the separating device 26 is preferably formed from a reticulated structure, such as a screen, mesh, rake, or the like. The separating device 26 is preferably made of plastic, metal, or any material that can withstand the forces necessary to sift through the litter 14. Any structure is sufficient for the separating device 26 as long as it has openings sized large enough to sift through the litter 14, such as typical cat litter, but small enough so that solid animal waste 12 and agglomerates will not typically fit therethrough. In one configuration, the separating device 26 includes a plurality of elongate rails 70 that are curved and spaced to extend in parallel relationship to each other for the length of the separating device 26 from end 62 to end 64. The rails 70 are attached by transverse, elongate supports 72. A plurality of openings 74 are formed between the rails 70 and supports 72, and the size and shape of the openings 74 may vary depending on the number, spacing, and size of the rails 70 and supports 72. It will be appreciated that the openings can be any shape as long as they are sized to allow litter to pass therethrough while impeding the animal waste 12 and clumped litter and agglomerates.

Referring now to FIGS. 4 and 5, the separating device 26 also includes a radially, outer edge 76 adjacent or engaged with the inner surface 60 of the chamber wall 19. Preferably, the outer edge 76 forms a scraping interface with the drum inner surface 60. That is, the outer edge 76 preferably engages, or is closely spaced from, the inner surface 60 while the separating device 26 rotates. Even if closely spaced from the drum surface 60, at least some of the loose material of litter and/or waste between the edge 76 and the surface 60 will scrape against the surface 60 so that a scraping interface between the edge 76 and surface 60 is still present during turning of the helical rake 26 in the drum 18. Further, the friction developed at the scraping interface will assist in transmitting the rotary drive forces of the rake 26 to the drum 18 for rotation thereof, as has previously been described. In addition, the scraping interface preferably keeps the amount of animal waste 12 or litter 14 that can pass between the outer edge 76 and inner surface 60 to a minimum for increasing the efficiency of the cleaning cycle.

The outer edge 76 may be a different material than the remainder of the separating device. For instance, the outer edge 76 may be formed from a resilient material such as rubber, or a more durable material such as nylon. In addition, the radially, outer edge 76 may also be one of the rails 70, or as illustrated, a double rail 78 combined to form a thicker, more durable edge.

As best seen in FIG. 6 the rear opening 32 is generally kidney-shaped and radially offset from the Z-axis. The arcuate rear opening 32 is generally disposed in an upper quadrant of the rear end wall 22, and generally corresponds with an entry opening 80 to the chute 36 so that at least a portion of the arcuate discharge opening 32 is aligned with the chute entry opening. As further described below, during a cleaning cycle the separating device 26 pushes animal waste 12 out the discharge opening 32 in the rear end wall 22, through the entry opening 80 of the chute 36 for being guided into the storage device 34. Because the rear end wall 22 may rotate with the drum 18, the arcuate opening 32 extends for sufficient angular distance in a circumferential direction about the Z-axis, e.g., about 20 to about 180 degrees (preferably less than about 90 degrees, such as 25 degrees), so that regardless of drum rotation, the rear opening 32 will at least partially overlap the entry opening 80. In this manner, animal waste 12 fed through discharge opening 32 will travel through chute opening 80 as well, for receipt in the storage container 34. Optionally, the rear end wall 22 may also include various sized and shaped openings 32, such as multiple openings, one large opening and the like, so long as the rear chamber opening 32 partially overlaps the entrance 80 at any position of the chamber 18. In an alternative embodiment, the rear end wall 22 may be stationary (i.e. the back wall of the chamber is not attached to the drum side wall 19 and is instead a part of the base or housing and substantially seals off the rear end of the drum). In that case, the rear opening 32 need only match the shape of the entry opening 80 or be smaller and overlapped thereby.

Referring again to FIG. 6, the rear wall 44, the chute 36, and a side wall 92 of the storage container 34 (best seen in FIG. 1) cooperate to enclose the rear of the apparatus 10 so that odors emanating from the rear opening 32 cannot readily escape the housing 40, and waste at the rear opening 32 will abut against the side wall 92 where the rear opening 32 extends beyond, above and/or below the entrance 80 of the chute 36. The housing 10 may have a back wall (not shown) that is positioned between the side wall 92 of the storage container 34 and the rear end wall 22 for the chamber 24.

Referring again to FIG. 1, the storage container 34 has a top rim 82 extending about an opening 84 and shaped to correspond to, and engage, a bottom rim 86 of the storage chute 36 for receipt of the animal waste 12 therethrough. Since the storage container 34 and the chute 36 are preferably removable from the apparatus 10, the apparatus 10 may also include a releasable connection 87 to secure the storage container 34 to the chute 36. As shown, the releasable connection is a friction fit between the edges 86 and 82; however, the releasable connection 87 may also include VELCRO® straps, hook tabs in grooves, fasteners, or any other device that secures the storage container 34 and/or chute 36 to the apparatus 10 when in use but permits their detachment when necessary to dispose of waste collected in the storage container 34, or to clean the storage container 34 and the chute 36. The container 34 may also include a detachable connection to the base 16 at one wall 16*a* thereof.

The chute 36 guides the removed animal waste 12 from the chamber 24 to the storage container 34. In order to keep odors from leaking from the storage container 34, the chute 36 seals the top rim 82 of the storage container 34, and the chute 36 has a pivoting door 88 mounted to the upper wall 36*a* of the chute, in an upper hinge 90 to close the entry opening 80 on the chute 36 (FIG. 1). The door 88 pivots inwardly toward the rear wall of the chute 36 when waste, transported by the separating device 26, presses against the door 88. After the waste 12 falls through the chute 36, a biasing member such as a leaf or torsion coil spring, for example, closes the door 88 at the entrance 80 of the chute 36 and generally seals the storage container 34 to reduce the presence of odors emanating from the apparatus 10.

Figure 13:
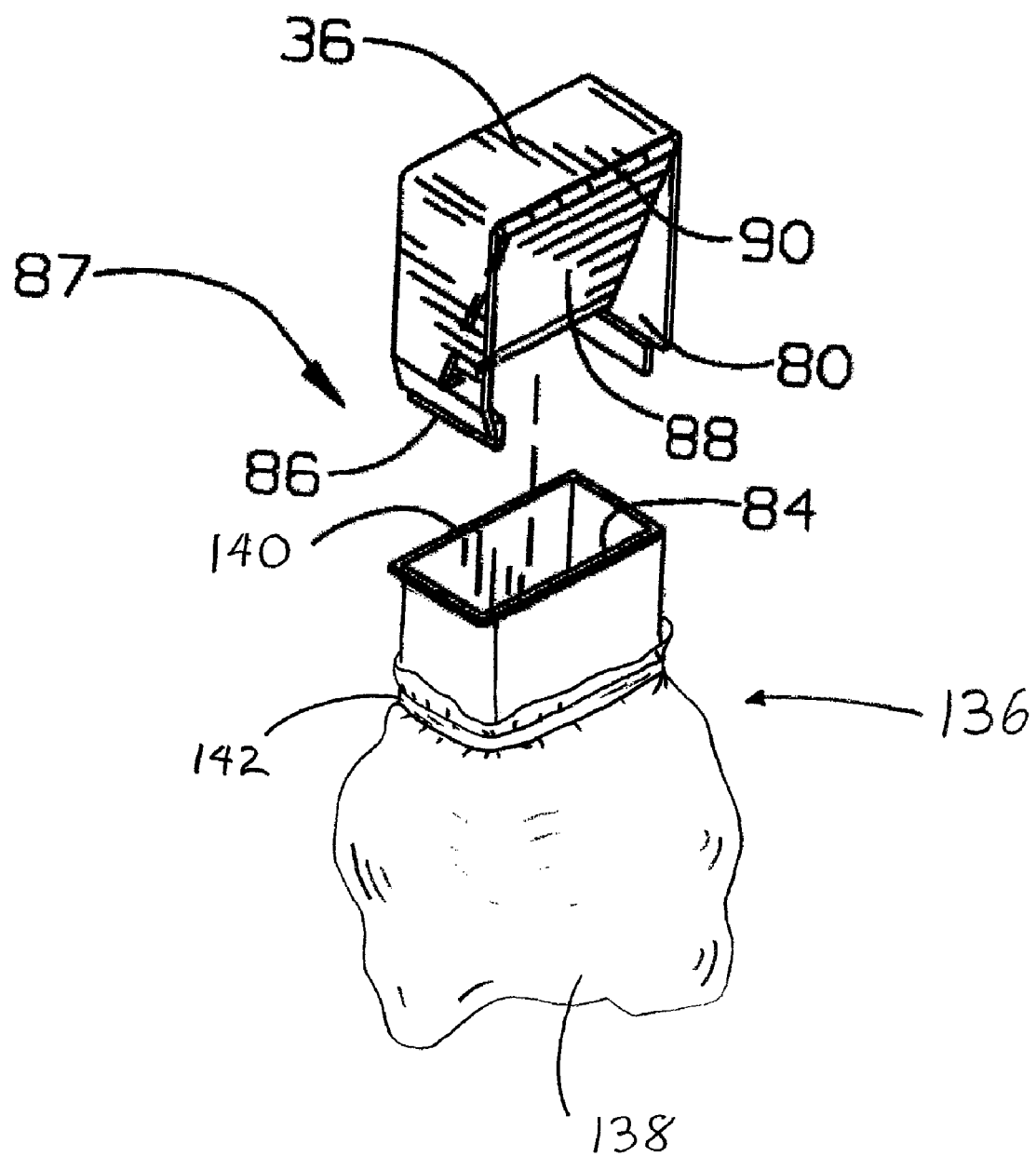
FIG. 13 is a perspective view of an alternative storage chamber for use with the apparatus of FIG. 1.

Referring to FIG. 13, an alternative storage chamber 136 is illustrated. In this form, the storage chamber 136 includes a disposable chamber 138, such as a typical plastic storage bag, and a coupling tube 140 to couple the disposable chamber 138 to the chute 36. The coupling tube 140 preferably joins to the chute 36 in a manner similar to the previously described storage chamber 34 and directs the waste 12 from the chute 36 into the disposable chamber 138 during a cleaning cycle. In the embodiment of FIG. 13, the disposable chamber 138 is joined to the coupling tube 140 via an elastic member 142, such as a rubber band; however, the disposable chamber 138 may be fastened to the tube 140 through other fastening methods such as hooks, loops, snaps, buttons, VELCRO®, tape, and the like. The alternative storage chamber 136 is advantageous in that the chamber 136 requires minimal cleaning as the disposable chamber 138 and any waste 12 contained therein are simply disposed of when full and a new, empty disposable chamber 138 is attached to the chute 36 and tube 140 when needed.

Referring to FIGS. 6 and 6A, the drum 18 may be formed from two half-cylinder members 18a and 18b. A mating edge 94 of each piece 18a, 18b is flared outwardly to form an edge flange 96 having a contact surface 98. The contact surfaces 98 of each member 18a and 18b are secured together as by welding or the like. The flanges 96 are preferably elongated and substantially run the entire axial length of the drum side wall 19, although it will be appreciated that the flanges 96 can be shorter or be discontinuous along the length of the drum side wall 19 at any desired spacing.

The housing 40 of the apparatus 10 is dimensioned to be slightly larger than the drum 18 to permit the drum 18 to rotate within the housing 40. Thus, as shown in FIG. 6, the inner width W of the housing 40 is slightly larger than the outer diameter D of the cylindrical side wall 19 of the drum 18. In one embodiment, the width W of the housing 40 is set to be small enough so that the flanges 96 or any other protrusion extending outwardly from the drum side wall 19 will engage with an inner surface 100 of the housing 40 to form the previously mentioned stop 106. Therefore, the flanges 96 interfering with the housing 40 stops rotation of the drum 18, thereby preventing continued rotation of the drum 18 past the stop 106.

More specifically, lower flanges 96a can contact the inner surface 100 of the left side wall 46 at position 104a (shown in phantom in FIG. 6A) and the base 16, and specifically the fins 38 thereof, at position 104c (FIG. 6) with the positions 104a and 104c being spaced by approximately 25 degrees. In this manner, if the drum 18 rotates, it is allowed to rotate at most about 25 degrees between positions 104a and 104c. Thus, the flanges 96a and the inner surface 104a cooperate to form the stop generally indicated as 106. Upper flanges 96b, on the opposite side of the drum side wall 19 from the lower flanges 96a, similarly engage with the housing side wall 48 and top wall 49 at diametrically opposite positions, to positions 104a and 104c to cooperate to form stop 106.

While the stop mechanism 106 is described as a protrusion from the drum side wall 19 that engages with the housing 40, any stop that limits the rotational motion of the drum 18 to a predetermined angular amount could be utilized. Thus, other stop mechanisms may be used such as having a protrusion from the housing or other part of the apparatus 10 that engages a surface or extension on the drum side wall 19. The stop may also be separate from the drum 18 and housing 40 or may be integral with both or associated with only one of those structures. In addition, while the stop mechanism or device 106 is described as a mechanical stop using the flanges 96 and housing 40, the stop device 106 may also be many other types of mechanical, electro-mechanical, or electrical stops, such as solenoid devices, photoelectric eyes, limit switches, braking devices, and the like.

Referring to FIG. 1, the apparatus 10 may also include a variety of monitoring devices, such as sensors, to monitor various conditions within the apparatus 10. For instance, the apparatus 10 may include an animal detection sensor 108 to detect when an animal enters and leaves the chamber 24 in order to delay or initiate a cleaning cycle after the animal has exited the drum 18. For example, the animal detection sensor 108 may be a photo eye device 108 including a transmitter 108a and received 108b disposed on the housing front wall 42. The transmitter 108a projects a light beam across the opening 54 toward the receiver 108b. When the beam is broken by an animal entering or leaving the drum 18 through the opening 54, the receiver 108b will send a signal to a controller 120 (FIG. 1) which controls operation of the rake motor 28.

In addition, the storage container 34 may also include a waste sensor 110 to determine when the storage container 34 is full of animal waste 12 and needs to be changed. A litter sensor 112 may also be placed in the chamber 24 to monitor the quantity of litter within the chamber. Because it is not uncommon for typical cat litter to clump upon contacting moisture or to stick to the animal waste 12, it is possible that litter 12 may also be removed from the chamber 24 during the cleaning cycle in agglomerates as has been described. As a result, the litter sensor 112 would detect when a predetermined amount of litter 14 has been removed from the chamber 24 after repeated cleanings to provide a notification that more litter 14 may need to be added to the chamber 24. As mentioned, the sensor 108 would send signals to the controller 120 connected to the rotary drive 28 for controlling its operation, and the sensors 110 and 112 can be operable to provide an audio or visual alert as appropriate when the container 34 needs to be emptied and the litter needs to be refilled in the drum, respectively.

Figure 12:
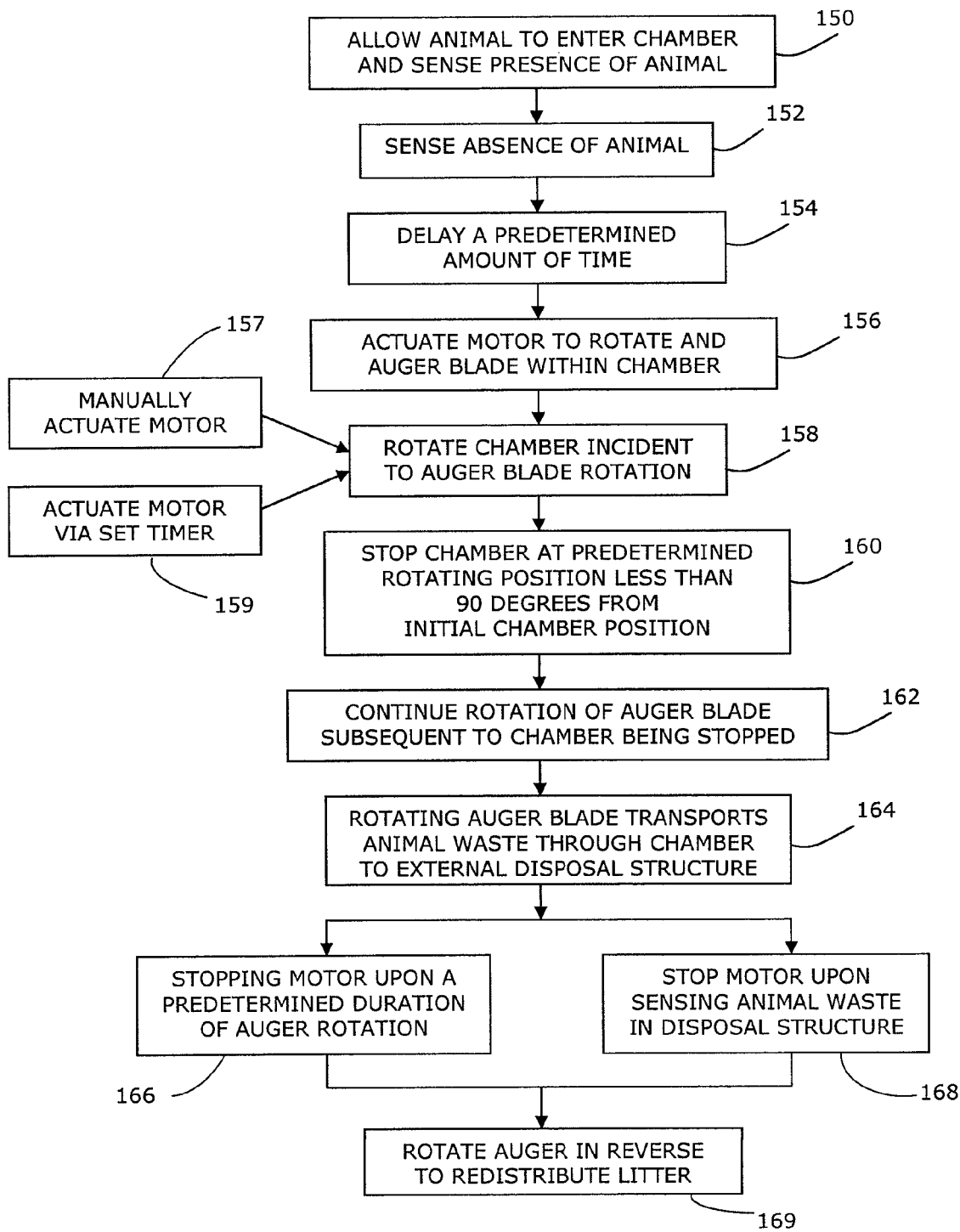
FIG. 12 is a flowchart of exemplary methods of removing animal waste using the apparatus of FIG. 1.

Referring now to FIGS. 7A,B through 11A,B and the flow chart of FIG. 13, the operation of the apparatus 10 and a typical cleaning cycle will be described. The flowchart of FIG. 13 illustrates exemplary steps to complete a cleaning cycle in three different modes of operation: an automatic mode, a manual mode, and a timed mode. In the automatic mode, after an animal, such as a cat, enters the chamber 24 and deposits a quantity of animal waste 12 therein, the apparatus 10 initiates a cleaning cycle to remove the animal waste 12 from the litter 14. The cleaning cycle may be delayed until the animal leaves the chamber 24 (step 154), and then started automatically (step 156) when the sensor 108 detects the absence of the animal from the chamber (step 152). In the alternative, the cleaning cycle may be initiated manually (step 157) by actuation of a switch or button (not shown) on the apparatus 10, such as on the exterior of the housing 40 that sends a signal to the rotary drive 28 or the controller 120 that controls the rotary drive 28. In the timed mode, the cleaning cycle is initiated after a predetermined length of time has elapsed after the last cleaning cycle (step 159), such as once per day. While three exemplary modes of operation of the apparatus 10 are disclosed in FIG. 12, the cleaning cycle of the apparatus 10 may also be initiated via other functions, signals, sensors and operate in other modes.

Once initiated, the rotary drive 28 rotates the drive shaft 68, which turns the drive rod 66 and the connected separating rake 26 within the drum 18 (step 156). The rotary drive 28 drives the rake 26 so that the rails 70, the supports 72, and the outer edge 76 of the separating device 26 are driven into the litter 14 and then continuously moved and rotated through the litter 14. The preferred helical, contoured shape of the separating device 26 permits the separating device 26 to sift through the litter to engage any waste 12 therein. The helical contour of the rake 26 scoops the waste and creates a forward-moving, sweeping, sifting and/or raking action on and through the litter 14 as it continues to be turned. As depicted in FIGS. 7A-7B, 8A-8B, and 9A-9B, this sweeping action moves any waste 12 on, or buried in, the litter 14 in a direction from the front end wall 20 toward the rear end wall 22 within the chamber 24. This sweeping action will also capture and move hardened clumps of litter 14 that agglomerated due to either the solid or liquid waste.

It will be appreciated that the separating device 26 can take on many different forms as long as it can be attached to the rotary drive 28 and it is still able to sift through the litter so that the litter is free to pass through it while the separating device 26 captures the waste 12. Thus, the separating device 26 may instead have more of a curvilinear or boxed scoop shape, or it may have other shapes, such as any curved, annular, penannular, or any other shape that can be rotated through the chamber 24 while performing the operations described herein. It is contemplated that a non-helical, separating device may need other mechanisms to drive it through the chamber 24, such as a telescoping rod or other equivalent structure.

As illustrated in FIGS. 9A and 9B, as the separating device 26 continues to rotate, the waste 12 is transported over or through the litter 14 until the waste 12 abuts the rear end wall 22 (step 164). The separating device 26 can be constructed so that any one point thereon will undertake 360 degrees of rotation with one full turn of the drive bar 66.

Once the waste 12 has contacted the chamber rear wall 22, further rotation of the separating device 26 separates the waste 12 from the litter 14, scooping the waste 12, and any adhering litter 14, in an upwardly direction along the rear end wall 22 towards the rear end wall opening 32, as illustrated in FIGS. 10A and 10B.

Referring to FIGS. 11A and 11B, when the waste 12 is lifted to where the rear end wall opening 32 communicates with the entry opening 80 of the chute 36, continued rotation of the helical rake 26 pushes the waste 12 against the door 88 so that it pivots open against its spring bias and the waste is directed through the rear end wall opening 32 and the entry opening 80. At this point, the open door 88 and gravity allow the animal waste 12 to drop into storage container 34 (step 164). The door 88 is biased to close and seal the waste 12 within the storage container 34 once the waste has passed through the chute 36.

The cleaning cycle may be stopped and the rotary drive 28 shut off via the controller 120, after rotating the separating device 26 a predetermined duration (step 166), after the detection of an animal about to enter the chamber 24, or after the detection of a full storage container 34 (step 168). With this configuration, the apparatus 10 is a self-cleaning litter box that removes the animal waste 12 from the chamber 24 with minimal outside intervention by a user.

As discussed previously, the rotary drive 28 can directly rotate the separating device 26 without the need to always first rotate the structure that forms the chamber 24 holding the litter, in this case the drum 18. In other words, when the separating device 26 is free to rotate within the drum 18, the rotary drive 28 does not need to continuously provide enough torque to overcome the weight of the drum walls 19, 20 and/or 22 as well as the weight of the litter 12. Therefore, the rotary drive 28 has a reduced peak power or maximum horse power/torque rating that is significantly less than what would be needed to continuously rotate a drum 18 permanently fixed to the separating device 26.

As also discussed previously, in a further aspect of the invention, a non-permanent driving engagement between the separating device 26 and the drum 18 may be formed so that the drum 18 rotates with the rotating separating device 26 for a short circumferential distance (step 158 and step 160). This may occur due to friction forces at the scraping interface between the rake edge 76 and inner drum surface 60. In addition, the chamber wall 19 will also rotate when the litter 12 adheres to the drum 18 due to agglomeration or other properties in the litter 14 that make the litter 14 particularly adherent or difficult to sift through. The strength of the resulting adherent force in this second situation may depend on the amount and/or weight of the litter 14, the position of the litter 14 within the chamber 24, the size and chemical properties of the litter grains, the type and amount of waste 12 in the litter 14, and/or the moisture content of the litter 14. Herein the term "adherent force" simply means any force that adheres the litter to both the separating device 26 and the drum wall 19 and may itself include a frictional component.

In either of the situations described above that cause the drum 18 to rotate with the separating device 26, these situations usually, but not always, occur upon start-up of the cleaning cycle when the motion of the separating device 26 is being initiated from a static state, when the largest amount of torque and the peak power requirement occurs. It will be understood, however, that the driving engagement between the rake and drum may occur at any time, causing the drum 18 to intermittently start and stop rotation throughout a cleaning cycle as a result of the properties of the litter 14, some of which were described previously, and which may affect the level of frictional and adherent forces between the separating device 26 and the drum 18.

Once the drum 18 is rotating with the separating device 26, the driving engagement will cease when the separating device 26 overcomes the frictional force or adherent force that have the rake 26 driving the drum 18 for rotation. In most cases, the rotation of the drum 18 and the separating device 26 will shift the litter 14 enough to reduce the frictional or adherent force so that the rotational force of the separating device 26 and the opposite force resulting from the weight of the drum 18 and the litter 14 overcomes the reduced frictional or adherent force so that the drum 18 will cease rotating with the rake 26. With this operation, the rotary drive 28 does not need to overcome the full frictional or adherent force that would occur if the chamber wall 18 was fixed. As a result, it is believed the peak power requirements of the rotary drive can be maintained at about less than half of that required by a configuration that uses a rotating sifting member in a fixed, non-rotating drum 18.

Referring again to FIGS. 6 and 6A, if the frictional or adherent forces are not overcome by the drive force applied to the rake 26, movement of the rake 26 relative to the drum 18 is caused by the stop device 106, as described above, halting the rotation of the drum 18 while the separating device 26 continues being turned therein. More specifically, when the chamber wall 18 rotates far enough so that its flanges 96a and/or 96b engage with the housing 40 (preferably a maximum of about 180 degrees or less of circumferential rotation and most preferably about 25 degrees), the drum 18 no longer rotates in the same direction as the rotary drive force applied to the rake 26.

At this point, the rotational force from the separating device 26, and in turn from rotary drive 28, must overcome whatever adherent or frictional force that has caused the chamber wall 18 to rotate this far. As mentioned above, this force should be reduced from the initial amount of force that caused the drum 18 to rotate. In addition, the engagement of the structure of stop device 106 may further shift the litter 14 and reduce the frictional or adherent forces.

With the stop device 106 ceasing further rotation of the drum 18, the driving engagement between the rake 26 and drum 18 is broken. At this point without further drum rotation, the outer edge 76 of the rake 26 scrapes along the inner surface 60 of the drum 18. In this instance, either the stuck litter 12 separates from the chamber wall 18 and/or the separating device 26 is able to now easily sift through litter 14 it was adhering to or pushing against.

After the separation, the drum 18 can either remain in place or can rotate back to its original, resting position. The separating device 26 can then continue to sift the litter 14 with the drum 18 substantially remaining in place, although it should be noted that the drum 18, if it has rotated back toward its initial rest position, may again be driven for rotation by the rake during the cleaning cycle.

After a cleaning cycle is complete, the rake 26 may have pushed a quantity of litter 14 towards the rear wall 22 of the drum 18, which may leave the litter 14 unevenly distributed within the drum 18. As a result, after the cleaning cycle is complete, the rotary drive 28 is preferably rotated in reverse so that the rake 26 is also rotated in reverse a short distance within the drum 18 (Step 169). In this manner, the rake 26 will move any litter 14 that may have accumulated near the rear wall 22 of the drum more evenly throughout the drum 18.

With the above-described arrangement, the rotary drive 28 can be smaller than similar devices that continuously rotate a chamber and a sifting member together, or devices that rotate a sifting member within a fixed chamber forcing the rotary drive to overcome the full frictional or adherent forces therein. This smaller rotary drive 28 is advantageous in that the device 28 can be less costly, weighs less, is quieter, and is more cost efficient to operate. As mentioned previously, a preferred rotary drive is a small 6 volt DC gear motor that operates on D-Cell batteries generating less than 0.1 horsepower, and preferably, about 1/50 horsepower.

While there have been illustrated and described particular embodiments of the present invention, it will be appreciated that numerous changes and modification will occur to those skilled in the art, and it is intended in the appended claims to cover all those changes and modifications which fall within the true spirit and scope of the present invention.

What is claimed is:

1. An apparatus for removing animal waste from litter, the apparatus comprising:
   a generally cylindrical enclosure in which litter is contained and having a longitudinal rotational axis extending therethrough and a generally cylindrical inner surface extending about the rotational axis;
   a separating device configured to separate animal waste from the litter when moved through the litter;
   a rotary drive operable to directly rotate the separating device in the cylindrical enclosure and through the litter in the enclosure for separating wastes;
   a support having a rotary bearing surface configured to support the enclosure so that the longitudinal rotational axis thereof extends generally horizontally and to allow the generally cylindrical enclosure to rotate on the rotary bearing surface and about the rotational axis as the separating device is rotated therein; and
   a radial outer scraping edge of the separating device engaged with or closely adjacent the enclosure inner surface to form a scraping interface therebetween with frictional forces at the scraping interface indirectly transmitting the rotary drive forces from the rotary drive to the cylindrical enclosure to cause the cylindrical enclosure to rotate on the rotary bearing surface.

2. The apparatus of claim 1 wherein the separating device has a helical configuration extending between axial ends of the cylindrical enclosure.

3. The apparatus of claim 1 including
   a stop configured and arranged so that the enclosure is only permitted to rotate by a predetermined, limited amount.

4. The apparatus of claim 1 including
   a stop arranged to permit a predetermined, limited amount of rotation of the enclosure with initial rotation of the separating device by the rotary device due to friction generated at the scraping interface between the enclosure and the separating device, the limited enclosure rotation allowing power requirements for the rotary drive to be kept to a minimum.

5. The apparatus of claim 4 including an outer, fixed structure, and the stop is between the outer structure and the enclosure.

6. The apparatus of claim 5 wherein the outer, fixed structure comprises a support base on which the enclosure is rotatably mounted or an outer housing in which the enclosure is disposed.

7. The apparatus of claim 4 wherein the rotary drive has less than about 0.1 horsepower.

8. The apparatus of claim 1 wherein the enclosure includes a discharge opening, and the separating device comprises a helical rake that leads to the discharge opening so that rotation of the rake carries waste through the enclosure to be fed out of the discharge opening.

9. The apparatus of claim 1 wherein the rotary drive and an end of the separating device include a coupling therebetween for rotating the separating device in the cylindrical enclosure upon operation of the rotary drive.

10. The apparatus of claim 1 wherein the separating device has openings of a predetermined size to allow litter to fit therethrough.

11. The apparatus of claim 1 wherein the support and the enclosure include a stop therebetween so that rotation of the enclosure is limited to a predetermined amount.

12. The apparatus of claim 11 wherein the predetermined amount is less than about ninety degrees of rotation.

* * * * *

UNITED STATES PATENT AND TRADEMARK OFFICE
CERTIFICATE OF CORRECTION

PATENT NO. : 7,487,742 B2
APPLICATION NO. : 11/278650
DATED : February 10, 2009
INVENTOR(S) : Michael Waters Page 1 of 1

It is certified that error appears in the above-identified patent and that said Letters Patent is hereby corrected as shown below:

In the Claims

Claim 1, Column 13, Line 54, delete "wastes;" and insert -- waste; --.

Signed and Sealed this

Twenty-second Day of September, 2009

David J. Kappos
*Director of the United States Patent and Trademark Office*